Jan. 20, 1948.    L. BENTZMAN    2,434,829
ADJUSTABLE TRIPOD HEAD
Filed Jan. 21, 1946    2 Sheets-Sheet 1
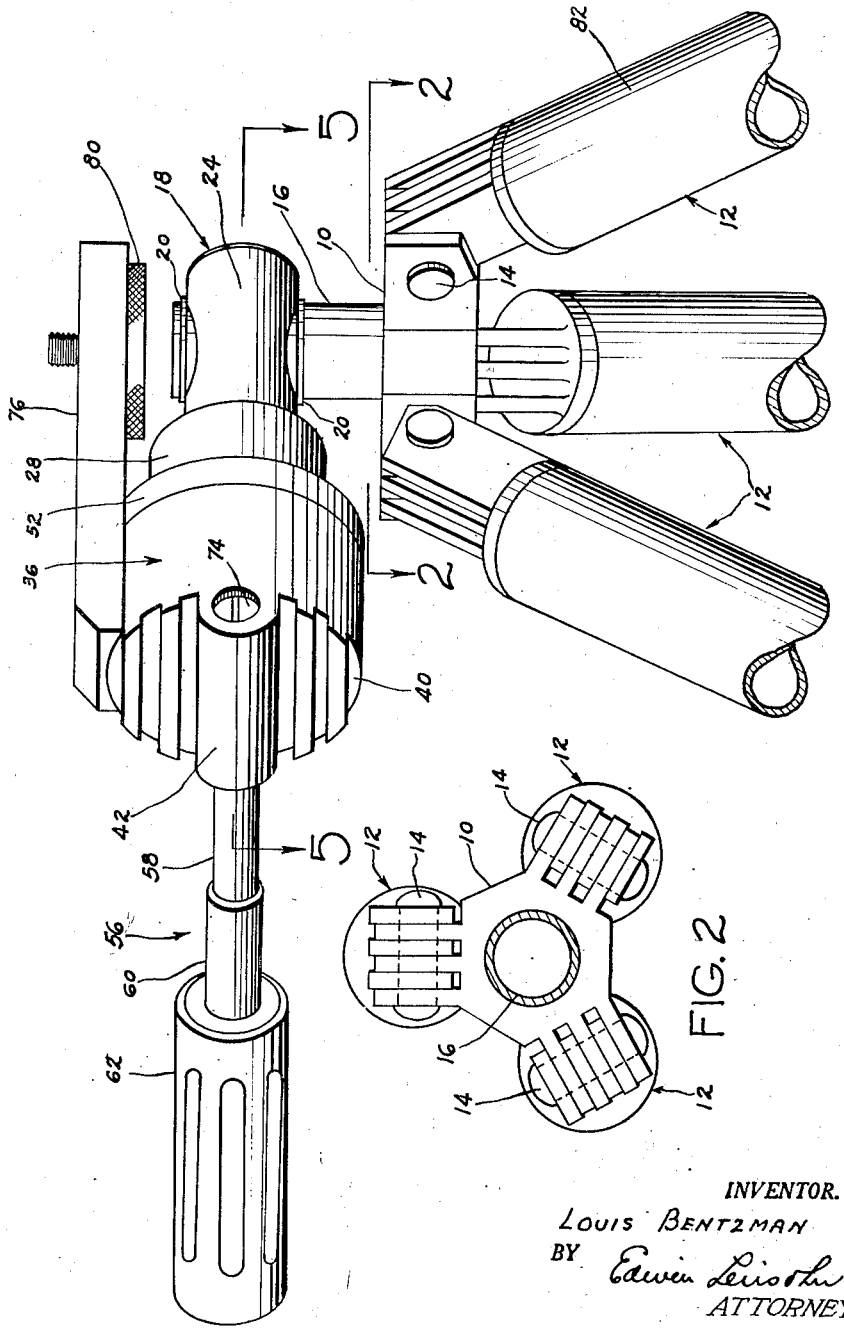
INVENTOR.
LOUIS BENTZMAN
BY Edwin Leisohn
ATTORNEY Jan. 20, 1948.　　　L. BENTZMAN　　　2,434,829
ADJUSTABLE TRIPOD HEAD
Filed Jan. 21, 1946　　　2 Sheets-Sheet 2
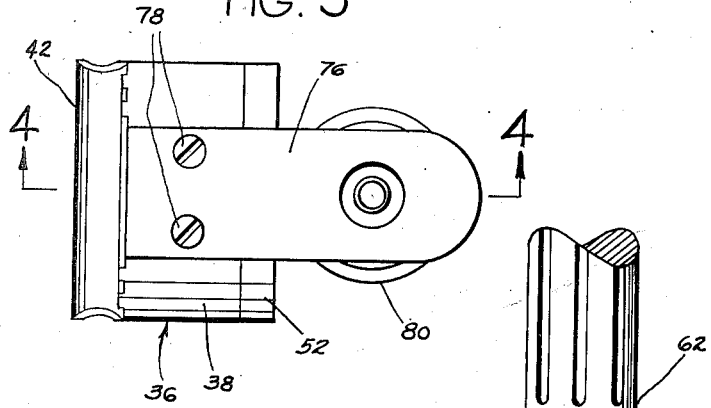
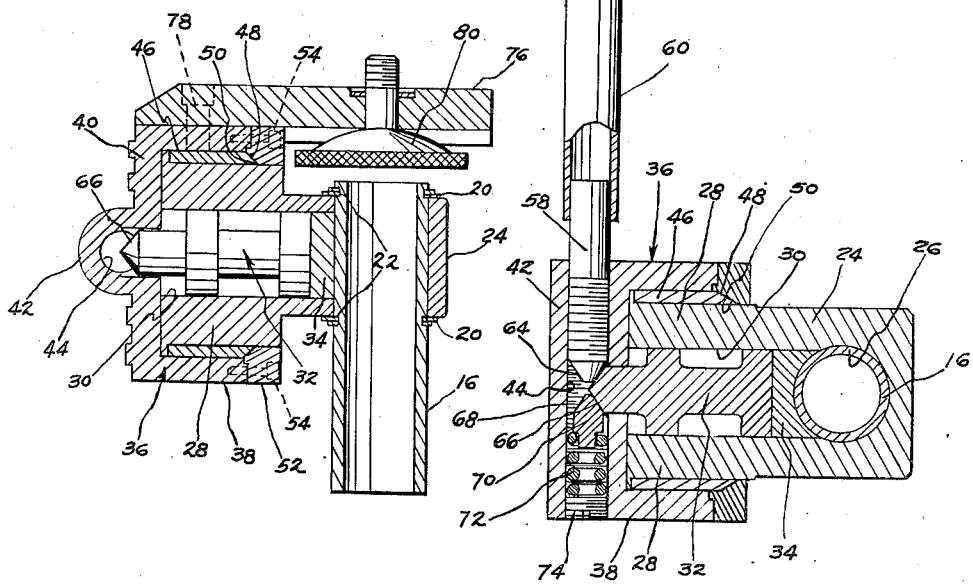
INVENTOR.
LOUIS BENTZMAN
BY Edwin Levisohn
ATTORNEY Patented Jan. 20, 1948

2,434,829

UNITED STATES PATENT OFFICE 2,434,829

ADJUSTABLE TRIPOD HEAD

Louis Bentzman, Bronx, N. Y., assignor to Acemator Co., Inc., New York, N. Y., a corporation Application January 21, 1946, Serial No. 642,487

6 Claims. (Cl. 248—183)

This invention relates to adjustable tripod heads which, while useful for other purposes, are intended primarily for supporting panoramic cameras in taking pictures.

An important feature of the tripod head of the present invention is the provision of means operable under the control of a single device for releasably securing the head in adjusted position about either or both of two axes of rotation. The provision of a tripod head having this feature constitutes one of the objects of the present invention.

A further object of the present invention is to provide for moving the tripod head about two axes of rotation by means of a handle connected to the head, said handle being also operable to effect releasable securement of the head in adjusted position thereof.

A further object of the invention is generally to improve the construction of adjustable tripod heads for panoramic cameras and to improve the operation of the tripod head. The above and other objects, features and advantages of the present invention will be fully understood from the following description reference being had to the accompanying illustrative drawings.

In the drawings:

Fig. 1 is a side view of an adjustable tripod head embodying the present invention;

Fig. 2 is a sectional view on the line 2—2 of Fig. 1;

Fig. 3 is a top plan view of the tripod head, the handle being removed;

Fig. 4 is a sectional view on the line 4—4 of Fig. 3;

Fig. 5 is a sectional view on the line 5—5 of Fig. 1.

Referring now to the drawings in detail, the adjustable tripod head of the present invention comprises a base 10 which is supported by the tripod legs 12, the upper ends of which are pivotally connected to said base by pivot pins 14. A post 16 is fixed to said base and constitutes a support for the yoke 18 of the head. Said yoke is rotatable about the axis of post 16 but is held against movement longitudinally of the post by washers 20 which are received in companion annular grooves 22 (Fig. 4) of the post.

The yoke 18 includes a lateral stem 24 provided with a cylindrical head 26, there being a bore 30 in said head which extends to the cylindrical bore 26 of the stem 24. A locking pin 32 is slidable longitudinally of bore 30 for coaction with a shoe 34 which is also slidable in said bore 30 in position to engage the peripheral portion of post 16. A cylindrical body 36 is mounted on the head 28 of the yoke 18 for turning movement about the axis of said yoke head. Said body 36 includes an annular wall 38 and an outer end wall 40 which is provided with a cylindrical portion 42 having a threaded bore 44 therein. A fiber sleeve 46 is disposed between the outer peripheral surface of the yoke head 28 and the inner peripheral surface of the annular part 38 of member 36. Said sleeve 46 is provided with a tapered end portion 48 which is engaged by the tapered surface 50 of an annular member 52 which is secured to member 36 in any suitable way as by a plurality of circumferentially spaced screws 54. The means for moving the adjustable head and for securing the same in adjusted position includes a member 56 which comprises a threaded pin 58, an extension tube 60 and a handle 62. Pin 58 has a tapered end 64 which engages portion 66 of locking pin 32. Said tapered end portion 66 of locking pin 32 is also engaged by the tapered end portion 68 of pin 70 which is held against tapered end portion 66 of locking pin 32 by a compression spring 72 adjustable by means of a nut 74 threaded into bore 44 at one end thereof.

A bracket 76 for supporting the camera not shown is mounted on member 36 being secured thereto in any suitable way as by screws 78. Said bracket is provided with a screw member 80 for fastening the camera in position on said bracket. It will be noted that the means for supporting the camera, namely the bracket 76, carried by member 36, is movable with member 36 in a horizontal plane about the axis of post 16 and in a vertical plane about the horizontal axis of the yoke 18.

In using the adjustable head for moving the panoramic camera, the pin 58 is released from the tapered end 66 of locking pin 32 by turning the handle 62 to disengage pin 58 from said locking pin, and while pins 58 and 32 are disengaged from each other, handle 62 is actuated for moving the adjustable head about either or both of the axes of turning movement of said head. It will be observed, however, that the spring projected pin 70 stays in engagement with the tapered end of the locking pin 32 and thus provides a uniform frictional contact between the shoe 34 and the post 16 opposing free turning movement of the camera support about the vertical axis of post 16. Similarly the fiber sleeve 46 provides a desirable amount of friction between yoke 18 and member 36 of the camera support for preventing free movement of the camera about a horizontal axis, that is about the horizontal axis of yoke 18. The frictional characteristics afforded by spring projected pin 70 and the fiber sleeve 46 which is engaged by the annular member 52 are such as to oppose free movement of the camera support when the handle 62 is released while at the same time allowing movement of the camera support by the actuation of handle 62. In other words, in the event that the handle 62 is released before it is operated to lock the member 36 in adjusted position, the friction provided by spring projected pin 70 and the sleeve 46 are sufficient to sustain the camera support in position against uncontrolled or free movement.

When it is desired to lock the camera support, that is to secure the adjustable head in adjusted position, handle 62 is rotated sufficiently to engage the tapered end 64 of pin 58 with the tapered end 66 of locking pin 32 for clamping the shoe 34 against post 16 whereby to prevent movement of the camera support about the vertical axis of said post, and at the same time annular member 52 is caused to engage the tapered end of sleeve 46 with sufficient force to lock cylindrical member 36 against movement about the horizontal axis of yoke 18 whereby to secure the adjustable end against turning movement about a horizontal axis. In this connection it will be noted that when handle 62 is turned for engaging the pin 58 with the locking pin 32, member 36 and the annular member 52 fastened thereto are moved axially of the yoke head 28, toward the left (viewing Fig. 5) so as to tighten the engagement between member 52 and the tapered end of sleeve 46. Thus it will be noted that by the simple operation of turning the handle 62 in one direction the adjustable head is released for turning movement about either or both of the turning axes of said head and that by turning the handle 62 in the opposite direction the adjustable head is locked against turning movement about either or both of said axes.

It will be understood that all of the parts of the adjustable head are preferably made of metal, except that the bearing and locking sleeve 46 is preferably formed of fiber and except that the handle 62 is preferably formed of a suitable plastic.

It will be understood that various changes in the details of construction and in the arrangement of parts of the adjustable head may be made without departing from the underlying idea or principles of this invention within the scope of the appended claims.

Having thus described my invention, what I claim and desire to secure by Letters Patent is:

1. In a tripod head having a base carried by the legs of the tripod, a post upstanding from said base, a first member mounted on said post for turning movement about a vertical axis, said first member having a longitudinal bore extending transversely of said axis, a clamping member slidable in said bore and engaging said post, a pin slidable in said bore for moving said clamping member against said post, a rotary member mounted for rotary movement on said first member and for movement on said first member toward and away from said post in a direction longitudinally of said bore, clamping means effective upon movement of said two members effective upon movement of said rotary member on said first member away from said post to lock said rotary member against rotary movement on said first member, and means carried by said rotary member for actuating said pin to effect the clamping operation of said clamping member, said last mentioned means being engageable with said pin to effect said movement of said rotary member away from said post.

2. An adjustable head comprising a first member mounted for rotary movement, said member having a longitudinal bore extending transversely of the axis of rotation of said member, means movable in said bore longitudinally thereof to lock said member releasably against rotary movement about said axis, a member mounted for rotary movement on said first member about the axis of said bore, said second member being also movable on said first member axially of said bore, and means operative upon said axial movement of said second member in one direction to lock said two members against relative movement.

3. An adjustable head comprising a first member mounted for rotary movement, said member having a longitudinal bore extending transversely of the axis of rotation of said member, means movable in said bore longitudinally thereof to lock said member releasably against rotary movement about said axis, a member mounted for rotary movement on said first member about the axis of said bore, said second member being also movable on said first member axially of said bore, and means operative upon said axial movement of said second member in one direction to lock said two members against relative movement, and means carried by said second member and operatively connected to said first mentioned means for actuating the latter to lock said first member against movement about said first mentioned axis.

4. An adjustable head comprising a first member mounted for rotary movement, said member having a longitudinal bore extending transversely of the axis of rotation of said member, means movable in said bore longitudinally thereof to lock said member releasably against rotary movement about said axis, a member mounted for rotary movement on said first member about the axis of said bore, said second member being also movable on said first member axially of said bore, and means operative upon said axial movement of said second member in one direction to lock said two members against relative movement, and means carried by said second member and operatively connected to said first mentioned means for actuating the latter to lock said first member against movement about said first mentioned axis and to simultaneously effect said movement of the second member axially of said bore in said one direction to lock said second member against rotary movement on said first member.

5. An adjustable head comprising two relative members mounted for rotary movement as a unit about one axis and in relation to each other about a second axis transverse to said first axis, one of said members being mounted on the other of said members for said relative rotary movement thereof and said one of said members being also movable on said second member in a direction transversely of said first mentioned axis, means coacting between said two members for effecting said movement of said one of the members transversely of said first mentioned axis, and means operative upon said last mentioned movement to lock said two members against relative movement about said second axis.

6. An adjustable head comprising two relative members mounted for rotary movement as a unit about one axis and in relation to each other about a second axis transverse to said first axis, one of said members being mounted on the other of said members for said relative rotary movement thereof and said one of said members being also movable on said second member in a direction transversely of said first mentioned axis, means coacting between said two members for effecting said movement of said one of the members transversely of said first mentioned axis, and means operative upon said last mentioned movement to lock said two members against relative movement about said second axis, and means also operative upon movement of said one of the members transversely of said first mentioned axis to lock said other member against movement about said first mentioned axis.

LOUIS BENTZMAN.

REFERENCES CITED

The following references are of record in the file of this patent:

UNITED STATES PATENTS

| Number | Name | Date |
|---|---|---|
| 1,909,554 | Howell | July 25, 1933 |
| 2,261,426 | Willcox | Nov. 4, 1941 |
| 1,854,951 | Neuwirth | Apr. 19, 1932 |
| 2,188,514 | Moore | Jan. 30, 1940 |